United States Patent
Tolmie

(10) Patent No.: US 8,214,825 B2
(45) Date of Patent: Jul. 3, 2012

(54) ELECTRONIC DEVICE AND METHOD FOR INSTALLING SOFTWARE

(76) Inventor: Shane Tolmie, Christchurch (NZ)

( * ) Notice: Subject to any disclaimer, the term of this patent is extended or adjusted under 35 U.S.C. 154(b) by 1143 days.

(21) Appl. No.: 12/042,321

(22) Filed: Mar. 4, 2008

(65) Prior Publication Data

US 2008/0244167 A1    Oct. 2, 2008

(30) Foreign Application Priority Data

Mar. 30, 2007    (NZ) ........................................ 554259

(51) Int. Cl.
*G06F 9/445* (2006.01)
(52) U.S. Cl. ...................................................... 717/174
(58) Field of Classification Search .................. 717/174, 717/177, 178
See application file for complete search history.

(56) References Cited

U.S. PATENT DOCUMENTS

| | | | |
|---|---|---|---|
| 6,026,007 A * | 2/2000 | Jigour et al. .................. | 365/51 |
| 7,089,551 B2 | 8/2006 | Fordemwalt et al. | |
| 7,143,408 B2 | 11/2006 | Anderson et al. | |
| 7,613,481 B2 * | 11/2009 | Aubert .......................... | 455/558 |
| 2003/0046447 A1 | 3/2003 | Kouperchliak et al. | |
| 2005/0102441 A1 | 5/2005 | Yeh et al. | |
| 2007/0234344 A1 | 10/2007 | Hamid et al. | |

* cited by examiner

*Primary Examiner* — Anna Deng
(74) *Attorney, Agent, or Firm* — Louis Ventre, Jr.

(57) ABSTRACT

A peripheral for a computer and a method of using the peripheral is for installing software onto the computer using Direct Memory Access. The peripheral comprises a computer accessible medium and a program product. The program product has codes to read and write to the Random Access Memory of the computer; and to bypass restrictions of the host computer Operating System that prevent the peripheral from gaining full access to all portions of the host computer's Random Access Memory. The preferred methods of using the peripheral automatically install software on a computer or copies forensic data from the computer's Random Access Memory once the peripheral is connected to the computer.

16 Claims, 4 Drawing Sheets

ELECTRONIC DEVICE AND METHOD FOR INSTALLING SOFTWARE

FIELD OF INVENTION

In the field of installation of computer software, computer utilities and computer security, a device and method for inserting new software into a computer Operating System and forensically examining the content of Random Access Memory while bypassing Operating System controls.

BACKGROUND OF THE INVENTION

Computers can be difficult to start and access if a user wants to do so avoiding the startup programs embedded in the Operating System. The present invention enables the installation of software onto a computer using a device and method that bypasses controls on the computer's Operating System. It further enables copying of forensic data from the computer without regard to a startup password or other security measures present on the computer.

DESCRIPTION OF PRIOR ART

The vast majority of computers have a number of sockets that can accept a computer peripheral. If a computer peripheral is connected to the computer, then the computer can be upgraded to perform more tasks. Examples of computer peripherals include, but are not limited to, extra data storage units, communications units, wireless access pointers, graphics cards and input/output modules.

Some computer peripherals can perform Direct Memory Access to the Random Access Memory on the computer motherboard. These peripherals can directly access the Random Access Memory of the computer, bypassing the Central Processing Unit. Examples of peripherals that can perform Direct Memory Access to the system Random Access Memory of a computer include, but are not limited to, peripherals that communicate via FIREWIRE, PCI, MINI-PCI, PCI EXPRESS, EXPRESSCARD, AGP, and PCMCIA.

If a peripheral can perform Direct Memory Access to system Random Access Memory, the Central Processing Unit is free to perform other processing tasks. This makes the computer operate much faster.

Any peripheral that can perform Direct Memory Access to the computer's Random Access Memory, bypassing the system Operating System, enables the preferred embodiment of the invention. If a peripheral can perform Direct Memory Access to system Random Access Memory, the Operating System running on the computer can be directly altered by patching Random Access Memory locations in memory. Patching of Random Access Memory locations in memory is used in the preferred embodiment of the invention to defeat computer security and install new software on the computer and/or copy forensic data.

The present invention enables a new method of installing software on a computer that bypasses the operating system environment. The new method is referred to as a Hardware Installer Method. What is known and typically used is a Software Installer Method that involves executing an installer program under or within the Operating System environment.

Methods are known for using hardware to install programs within the Operating System environment but these methods are a subset of the Software Installer Method because they operate within the Operating System environment. For example, United States Patent Application 20070234344 teaches a method and system for installing portable executable applications using a first executable environment on a host computer for software application execution within the Operating System environment. The present invention is different in that it does not use any part of the Operating System environment for the bulk of the installation process.

To date, there is no known Hardware Installer Method because no known installer method bypasses the computer Operating System environment.

An advantage of the Hardware Installer Method over the Software Installer Method is that software can be quickly and easily installed on the computer, regardless of what state the Operating System is in.

Another advantage in using the Hardware Installer Method is that software can be installed on a computer that is powered up, but logged out, and can be done without providing information the computer Operating System would normally require to login, such as user authentication including, but not limited to, a username and password, a smartcard, a thumbprint, biometric identification, or an authentication token of some form.

Another advantage in using the Hardware Installer Method is that software can be installed on a computer that is powered down or powered up. If it is powered down, the peripheral is plugged in and the computer is started normally and installation or copying forensic data is automatic. If the computer is already powered up, there is no need to shut down. The peripheral is plugged in and it automatically installs the software or copies the forensic data on the computer's Random Access Memory. Also, the methods may be accomplished with user interaction, if desired. In this manner, the software installation or computer interrogation may take place with or without interaction with the computer.

The invention has application to law enforcement forensic analysis of computers, for example, to gather evidence which would help with fighting crime, or to aid with homeland security or terrorism.

This invention has application to large companies, for example, to install security patches and upgrades throughout their organization. This can be accomplished by either plugging a tailored peripheral into a computer that is powered up, or by plugging the tailored peripheral into a powered-down computer and then powering it up.

Since tailoring a peripheral according to the invention requires a deep understanding of the Operating System kernel, the Hardware Installer Method will be accessible only by a peripheral made consistent with the present invention.

Accordingly, the present invention will provide a novel Hardware Installer Method and device bypassing the computer Operating System and installing new software to a computer. It provides users with an expanded choice for accessing a computer and adding software without having to navigate through programs embedded in the Operating System.

Further aspects and advantages of the present invention will become apparent from the ensuing description and drawings, which are given by way of example only.

BRIEF SUMMARY OF THE INVENTION

The present invention is a peripheral for a host computer and a method using the peripheral for installing software onto the host computer or copying forensic data from the host computer. The peripheral communicates with the host computer using Direct Memory Access, including but not limited to, FIREWIRE, PCI, PCI EXPRESS, EXPRESSCARD and PCMCIA. The peripheral comprises a computer accessible medium and a program product.

The program product has executable instruction codes stored on the computer accessible medium comprising a code means to read and write to the Random Access Memory of the host computer; and to bypass restrictions of the host computer Operating System that prevent the peripheral from gaining full access to all portions of the Random Access Memory by altering the peripheral configuration to simulate a device, or class of devices, that has access to all of Random Access Memory, if restrictions of the host computer Operating System prevent the peripheral from gaining full access to all portions of the Random Access Memory.

To install software on the host computer, the code means additionally enables the peripheral to read Random Access Memory to determine the version of the Operating System on the host computer; analyze Random Access Memory to determine the addresses of low level system function calls; copy the software to the host computer; and, insert a kernel of code into the Random Access Memory to initiate and complete installation of the software that has been copied into Random Access Memory.

To copy forensic data from the host computer, the code means additionally enables the peripheral to copy the Random Access Memory to the computer accessible medium.

Optional functions of the code means enables the peripheral to identify an area of Random Access Memory of sufficient size to hold a copy of the software; reserve an area of Random Access Memory of sufficient size to hold a copy of the software; install the software on the host computer regardless of any state of existing code or programs on the host computer, and regardless of software access permissions in the host computer Operating System; remove interactive messages required by the Operating System to install hardware or software; unlock the host computer, bypassing any Operating System request for user authentication; record debugging activity on the host computer; bypass software or hardware security measures otherwise implemented by the Operating System; display a control panel which allows user interaction with the host computer; and monitor RS232 activity an IBM-PC compatible computer.

In the method of using the peripheral to install software on a computer, steps include copying the software onto the computer accessible medium of the peripheral; plugging the peripheral into a host computer; powering the computer up if it is off, and waiting for the code means to complete the software installation.

The method of using the peripheral to copy forensic data includes steps of plugging the peripheral into a host computer, powering on the host computer if it is off, and waiting for the code means to copy the Random Access Memory to the computer accessible medium.

BRIEF DESCRIPTION OF THE DRAWINGS

The reference numbers in the drawings are used consistently throughout. Reference numbers in FIG. 1 are given 100 series numbers, new reference numbers in FIG. 2 are given the 200 series numbers, new reference numbers in FIG. 3 are given the 300 series numbers, new reference numbers in FIG. 4 are given the 400 series numbers.

DETAILED DESCRIPTION

In the following description, reference is made to the accompanying drawings, which form a part hereof and which illustrate several embodiments of the present invention. The drawings and the preferred embodiments of the invention are presented with the understanding that the present invention is susceptible of embodiments in many different forms and, therefore, other embodiments may be utilized and structural and operational changes may be made without departing from the scope of the present invention.

Figure 1:
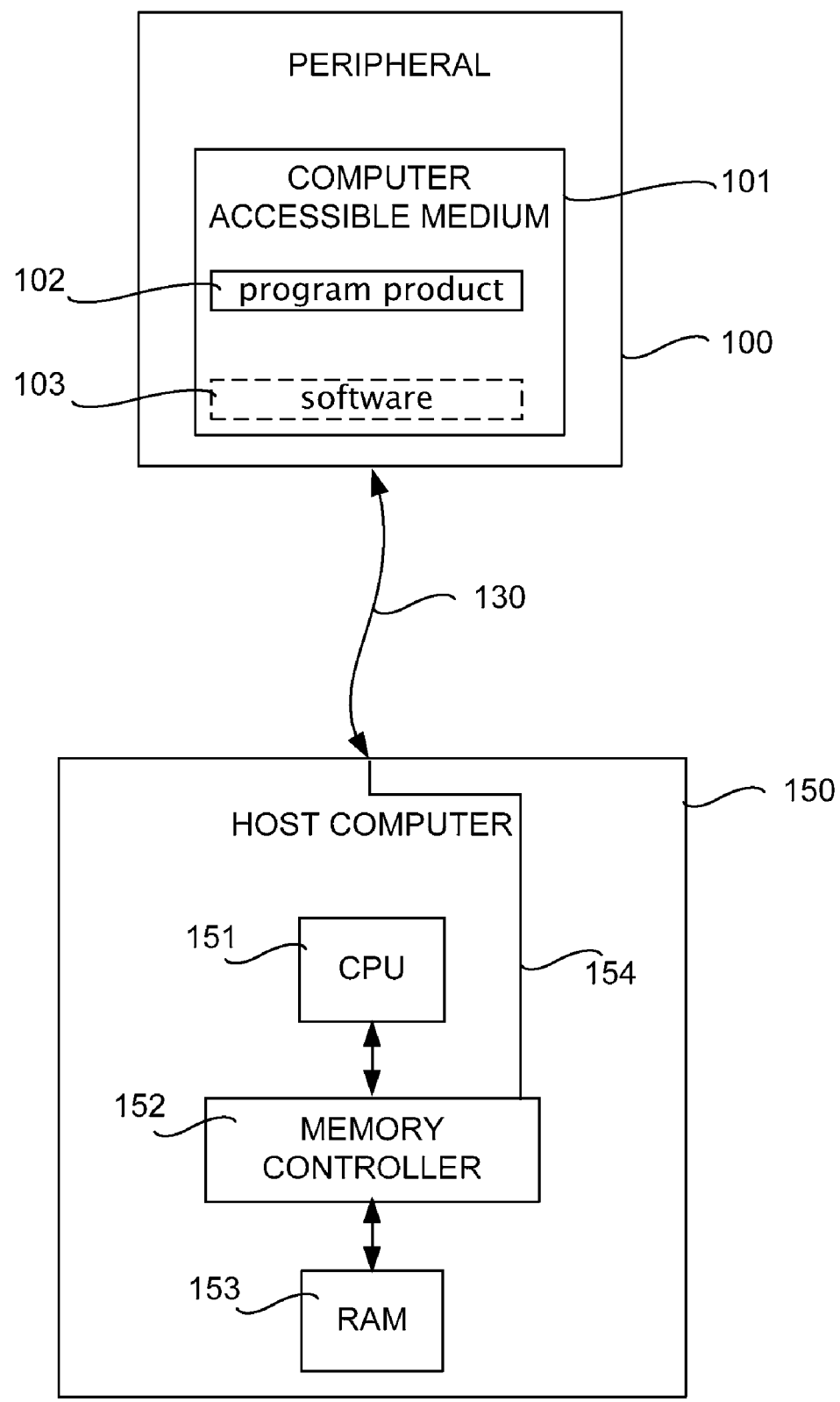
FIG. 1 is a block diagram showing components of a preferred embodiment of the peripheral connected to a host computer.

FIG. 1 illustrates preferred embodiments of the peripheral (100) connected to a host computer (150). Preferred embodiments of the peripheral (100) comprise computer accessible medium (101) and a program product (102), which are shown in solid line boxes in FIG. 1. The computer accessible medium is any computer medium that is readable and writable.

An embodiment of the invention to install software (103) on the host computer (150) also comprises the software (103) that is on the computer accessible medium of the peripheral (100). Since the software (103) element is only necessary for the embodiment that installs software (103) on the host computer (150), it is shown in a box with dashed lines. The computer accessible medium may be Read Only Memory that is written to once to contain the software, or may be re-writable memory.

Shown in a box with dashed lines is software (103) to install onto the host computer (150) to upgrade the capabilities of the host computer (150) system. Software (103) is defined very broadly and includes any code sought to be installed on the host computer (150). For example, a patch for existing programs already installed on the host computer (150) is included in the definition of software (103).

The host computer (150) is a desktop or laptop computer running any Operating System, including, but not limited to, WINDOWS, LINUX, MAC OS, DOS, BEOS, OS/2 or UNIX. When a host computer (150) is running the Central Processing Unit (151) is executing instructions contained in the computer's Random Access Memory (153). Most computers have one Central Processing Unit (151); some computers have multiple Central Processing Units. The Central Processing Unit (151) obtains instructions from the computer's Random Access Memory (153) through a memory controller (152).

The peripheral (100) uses a Direct Memory Access interface (1 30) with the host computer (150). Direct Memory Access is a feature of computers that allows peripherals and hardware subsystems within the computer to access system memory for reading and/or writing independently of the Central Processing Unit, represented by path indicated at (154).

The peripheral (100) is a hardware device capable of Direct Memory Access to the host computer (150) Random Access Memory (153). Examples of a preferable peripheral (100) include a device able to use the IEEE 1394 interface connection, such as FIREWIRE which is Apple Inc.'s brand name for an IEEE 1394 interface; PCI, which is the Peripheral Component Interconnect, or PCI Standard, that specifies a computer bus for attaching peripheral devices to a computer motherboard; PCI EXPRESS which is usually abbreviated as PCI-E or PCIe, is a computer expansion card interface format introduced by IBM-PC in 2004; PCMCIA which is an international standard by Computer Memory Card International Association that defines the PC Card (formerly known as "PCMCIA card") and EXPRESSCARD standards which can be used for wireless connectivity, modem and other functions in laptop/notebook PCs that may be lacking them natively; or, CARDBUS, which is a 32-bit version of the PCMCIA PC Card standard.

As an example, when a FIREWIRE peripheral is plugged into the host computer, it has the ability to access system Random Access Memory (153) via the memory controller (152). Direct Memory Access to the system Random Access Memory (153) can bypass the Central Processing Unit (151) in the host computer (150) that is running an Operating System.

Figure 2:
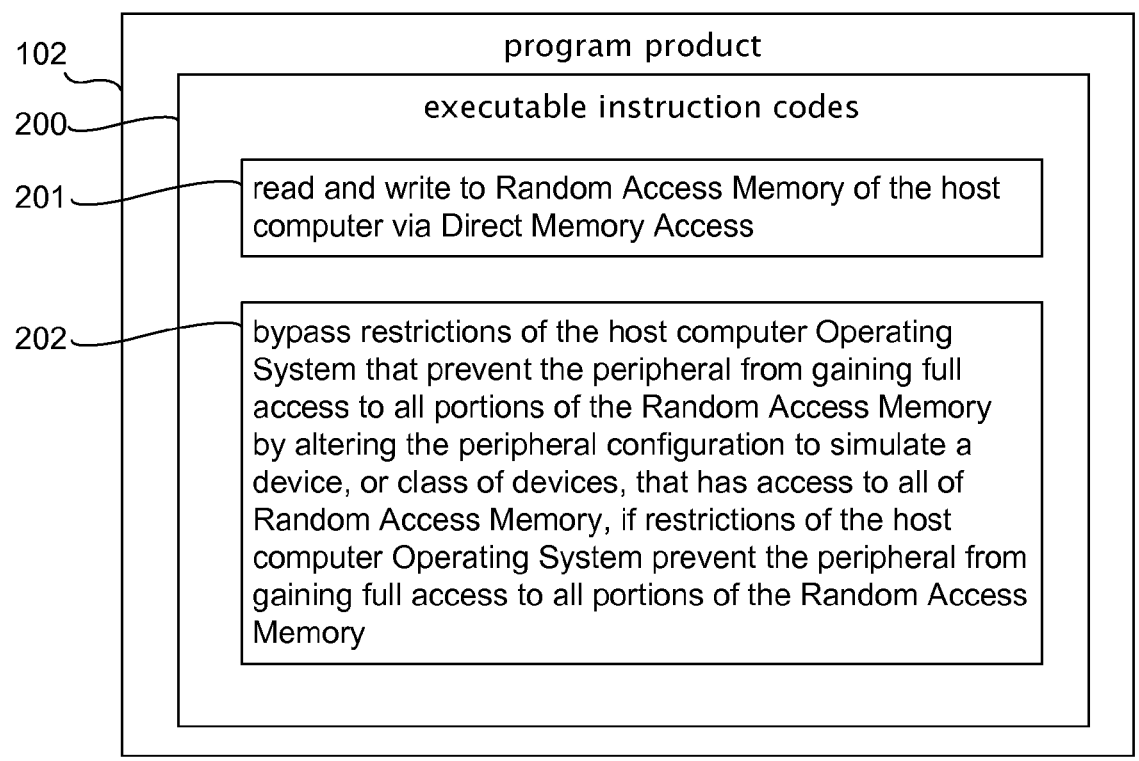
FIG. 2 is a block diagram showing required elements of the program product component of preferred embodiments of the peripheral.
Figure 3:
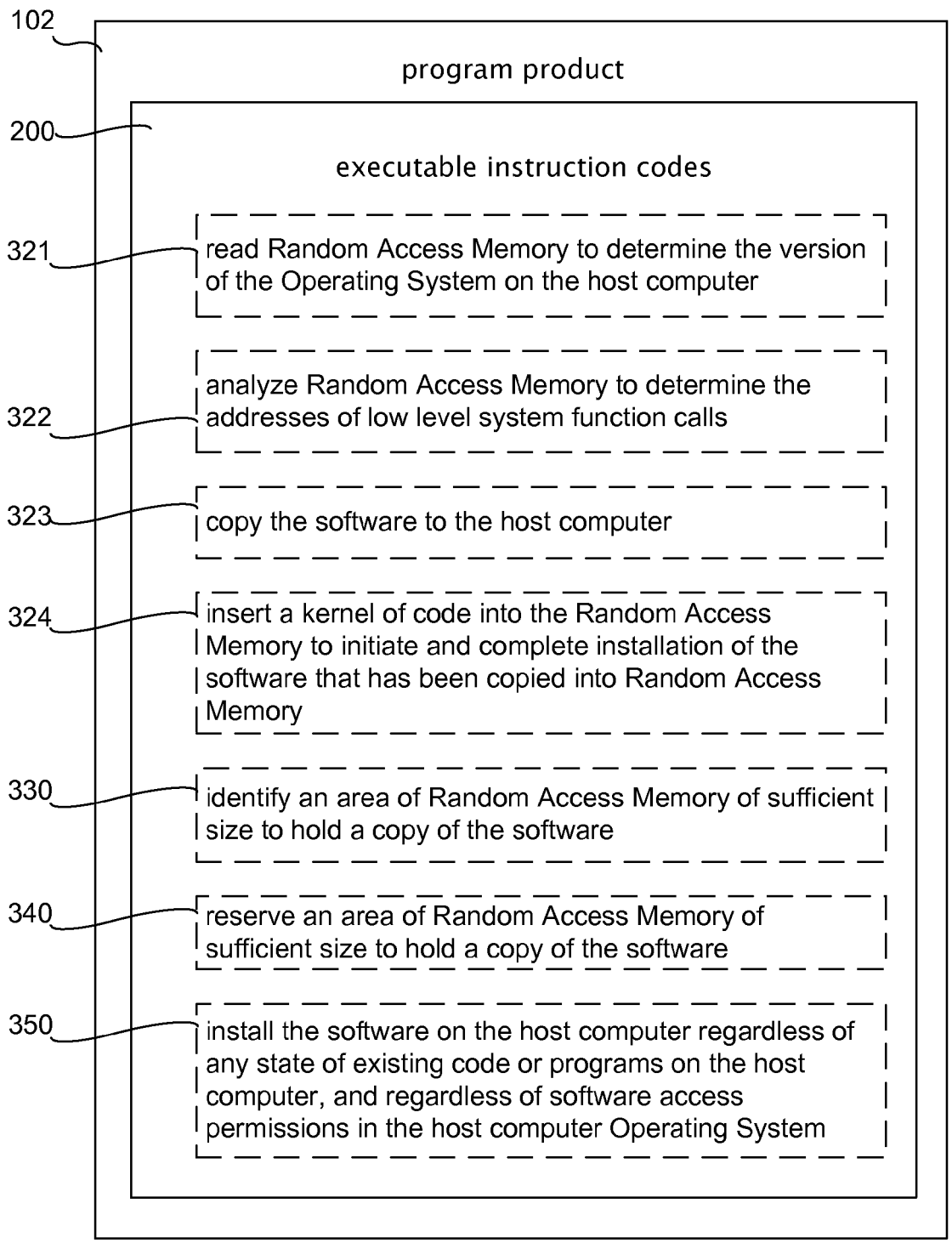
FIG. 3 is a block diagram showing optional elements of the program product component of preferred embodiments of the peripheral.
Figure 4:
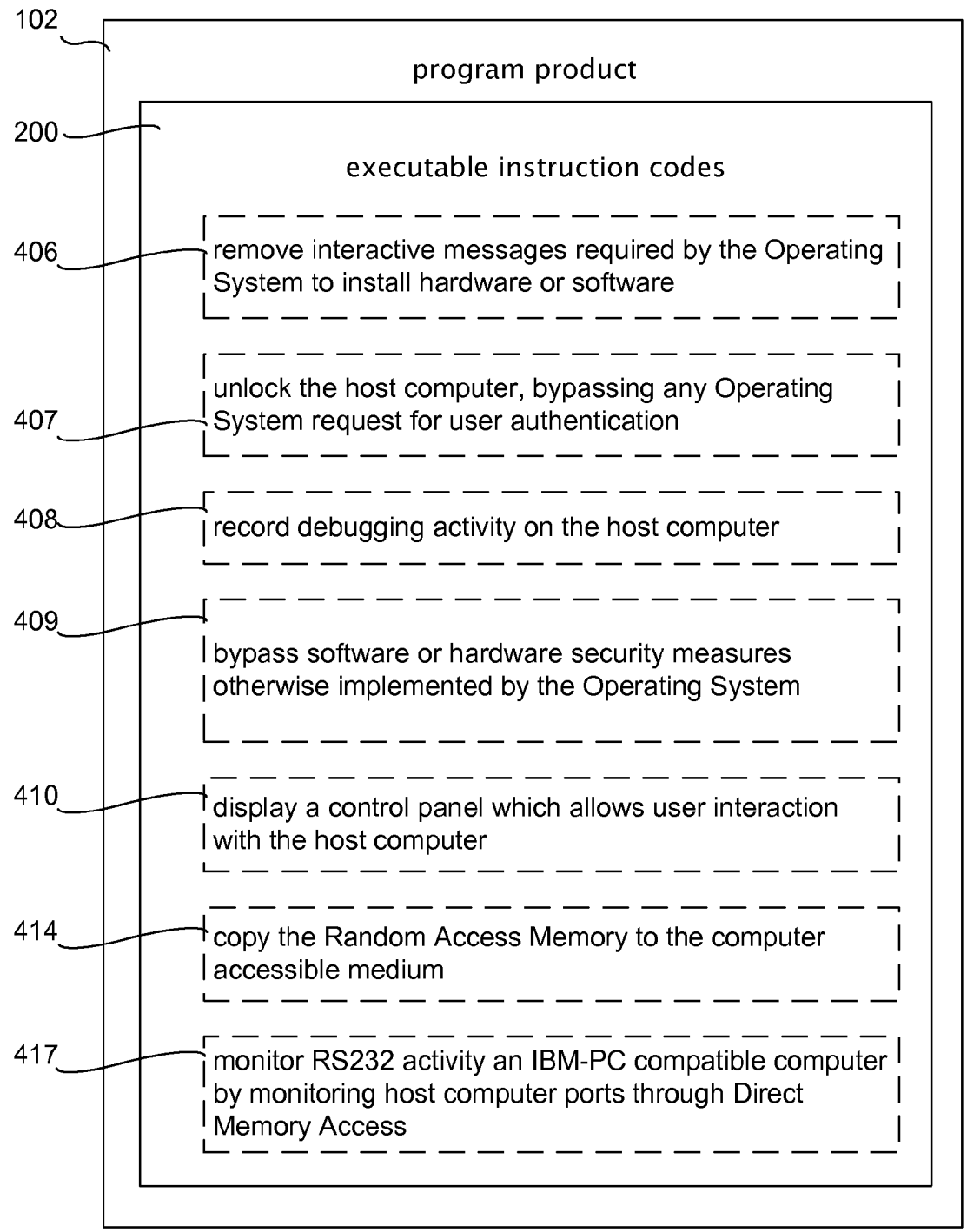
FIG. 4 is a block diagram showing optional elements of the program product component of preferred embodiments of the peripheral.

FIG. 2 shows a detailed block diagram of required executable instruction codes (200) of the program product (102) in preferred embodiments of the peripheral.

The program product (102) is stored on the computer accessible medium (101) and has a code means to:
- (201) Read and write to Random Access Memory (153) of the host computer (150) via Direct Memory Access. This requires a Direct Memory Access interface (130) with the host computer (150). And,
- (202) Bypass restrictions of the host computer (150) Operating System that prevent the peripheral (100) from gaining full access to all portions of the Random Access Memory by altering the peripheral (100) configuration to simulate a device, or class of devices, that has access to all of Random Access Memory, if restrictions of the host computer (150) Operating System prevent the peripheral (100) from gaining full access to all portions of the Random Access Memory. Altering the peripheral (100) configuration involves overwriting the peripheral's configuration space, known in the art as "configuration ROM." This enables the peripheral to gain access to all of the host computer's (150) Random Access Memory. If there are no restrictions on the host computer (150) Operating System prevent the peripheral (100) from gaining full access to all portions of the Random Access Memory, then this part of the code does not activate with installing software (103) on the host computer (150) or copying the host computer's (150) Random Access Memory. In the method of the invention, this code means (202) would typically activate if the peripheral is a FIREWIRE device; and would not activate if it is an EXPRESSCARD, PCMCIA, PCI, or PCI EXPRESS device.

The program product (102) to enable the copying of software (103) to the host computer (150) further comprises a code means to:
- (321) Read Random Access Memory to determine the version of the Operating System on the host computer. This code means ensures that the correct technique to install software (103) is selected based on the type of Operating System present in Random Access Memory of the host computer (15).
- (322) Analyze Random Access Memory to determine the addresses of low level system function calls. This code means causes the peripheral (100) to chain through addresses in the host computer's (150) Operating System to determine the addresses of the system function calls. The addresses of these key function calls are saved for later reference. This technique is used to ensure that a different service pack or build of the Operating System does not result in incorrect areas of Random Access Memory being patched, that is used, by the peripheral.
- (323) Copy the software (103) to the host computer (150). This code means (323) is preferably constructed with executable code that implements by asking asks the host computer (150) Operating System to reserve part of the host computer's (150) Random Access Memory. If there is not enough space in Random Access Memory, the host computer (150) Operating System will then page part of its Random Access Memory out to external storage, to make room for the software application.
- (324) Insert a kernel of code into the Random Access Memory to initiate and complete installation of the software (103) that has been copied into Random Access Memory. Once inserted, this kernel of code starts or initiates and causes the host computer (150) to complete installation of the software.

This preferred embodiment of the program product (102) for software installation is an autonomous and automatic operation. In conjunction with code means (202), software is preferably installed on the host computer (150) regardless of any state of existing code or programs on the host computer (150), and regardless of software access permissions in the host computer Operating System. This functionality is further stated in code means (350) discussed below.

Additional functionality of the program product (102) to supplement the copying of software (103) to the host computer (150) further comprises one or more of the following code means to:
- (330) Identify an area of Random Access Memory of sufficient size to hold a copy of the software (103).
- (340) Reserve an area of Random Access Memory of sufficient size to hold a copy of the software (103). This code means is performed after the host computer's (150) Operating System has completed its startup. This code means typically includes a check to confirm that the Operating System is ready. This code means (340) causes the host computer's (150) Operating System to execute a first kernel of code, which reserves a block of memory that is seeded with one or more pre-determined data values. Then, this code means (340) searches through system Random Access Memory to find the same pre-determined data values. Then, this code means (340) reads the software (103) from the computer accessible medium (101), that is, non-volatile storage memory in the peripheral (100), and copies software (103) into this reserved area of system Random Access Memory (153) on the host computer (150). This and code means (350) is an alternative code means enabling copying the software (103) to the host computer (150) as discussed above in code means (323).
- (350) Install the software on the host computer (150) regardless of any state of existing code or programs on the host computer (150), and regardless of software access permissions in the host computer (150) Operating System. Code means (350) enables software installation to proceed regardless of the state of the Operating System present on the computer. Software installation proceeds even if the computer is logged out and regardless of any software or hardware security present on the host Operating System.
- (406) Remove interactive messages required by the Operating System to install hardware or software (103).
- (407) Unlock the host computer (150), bypassing any Operating System request for user authentication.
- (408) Record debugging activity on the host computer (150).

(409) Bypass software or hardware security measures otherwise implemented by the Operating System.

(410) Display a control panel which allows user interaction with the host computer (150). Preferably, the peripheral (100) acts autonomously and automatically and no such user interaction is needed.

(414) Copy the Random Access Memory to the computer accessible medium. This code means (41 4) is preferably used when a forensic copy of the host computer's (150) Random Access Memory is desired. This code means (414) does not require the software installation code means to perform, but rather is accomplished in conjunction with code means (201) and (202), discussed above.

(417) Monitor RS232 activity an IBM-PC compatible computer by monitoring host computer ports through Direct Memory Access. This code means (417) has it broadest application in conjunction with code means (201) and (202), discussed above.

Preferred methods of using the peripheral to install software on a computer include the steps of copying the software (103) onto the computer accessible medium (101) of the peripheral (100); plugging the peripheral (100) into a host computer (150) that is either powered up or powered down; if it is powered down, the host computer (150) must be powered up; and waiting for the waiting for the code means to complete the software installation. The steps of this preferred method or for any methods of the invention are not limited by the order they are listed in this specification and may be performed in any order that results in installation of the software.

Preferred methods of using the peripheral to copy forensic data from a computer include the steps of plugging the peripheral (100) into a host computer (150) that is either powered up or powered down; if it is powered down, the host computer (150) must be powered up; and waiting for the waiting for the code means to copy the Random Access Memory to the computer accessible medium (101). The steps of the invention are not limited by the order they are listed in this specification and may be performed in any order that results in installation of the software. As above, the steps of this preferred method are not limited by the order they are listed in this specification and may be performed in any order that results in a copy of the Random Access Memory on the peripheral's (100) computer accessible medium.

The net effect of this sequence of events in the method of using the peripheral for software (103) installation is that the hardware peripheral is plugged into the host computer, and several seconds later software (103) is installed on the host computer (150).

Thus, the peripheral can perform any arbitrary task on the computer, including but not limited to installing new security patches, installing Operating System upgrades, bypassing security prompts requiring a password, installing application upgrades, and displaying a command console.

The above-described embodiments including the drawings are examples of the invention and merely provide illustrations of the invention. Other embodiments will be obvious to those skilled in the art. Thus, the scope of the invention is determined by the appended claims and their legal equivalents rather than by the examples given.

What is claimed is:

1. A peripheral connected to a host computer, the peripheral comprising:
   a non-transitory computer accessible medium;
   software stored in the non-transitory computer accessible medium to be installed into the host computer; and
   a program product having executable instruction codes stored in the non-transitory computer accessible medium, the program product comprising a code means to:
   read and write to a random access memory in the host computer via direct memory access;
   bypass restrictions of an operating system in the host computer that prevent the peripheral from gaining full access to all portions of the random access memory by altering a configuration of the peripheral to simulate a device, or a class of devices, that has access to the all portions of the random access memory if the restrictions of the operating system prevent the peripheral from gaining full access to the all portions of the random access memory;
   read the random access memory to determine a version of the operating system;
   analyze the random access memory to determine addresses of low level system function calls;
   copy the software from the non-transitory computer accessible medium into the random access memory; and
   insert a kernel of code into the random access memory to initiate and complete installation of the software that has been copied into the random access memory.

2. The peripheral of claim 1, wherein the program product further comprises a code means to identify an area of the random access memory that has sufficient size to hold a copy of the software.

3. The peripheral of claim 1, wherein the program product further comprises a code means to reserve an area of random access memory that has sufficient size to hold a copy of the software.

4. The peripheral of claim 1, wherein the program product further comprises a code means to install the software into the host computer regardless of any state of existing code or programs in the host computer, and regardless of software access permissions in the operating system.

5. The peripheral of claim 1, wherein the program product further comprises a code means to remove interactive messages required by the operating system to install hardware or software.

6. The peripheral of claim 1, wherein the program product further comprises a code means to unlock the host computer, bypassing any operating system request for user authentication.

7. The peripheral of claim 1, wherein the program product further comprises a code means to record debugging activity in the host computer.

8. The peripheral of claim 1, wherein the program product further comprises a code means to bypass software or hardware security measures otherwise implemented by the operating system.

9. The peripheral of claim 1, wherein the program product further comprises a code means to display a control panel which allows user interaction with the host computer.

10. The peripheral of claim 1, wherein the peripheral connection to the host computer is selected from a group consisting of FIREWIRE, PCI, PCI EXPRESS, EXPRESSCARD, AGP, PCMCIA, and CARDBUS.

11. A method of using the peripheral of claim 1, to install forensic software into the host computer while the host computer is powered down, comprising the steps of:
   copying the forensic software into the non-transitory computer accessible medium of the peripheral;
   plugging the peripheral into the host computer;
   powering on the host computer; and
   waiting for the kernel of code to complete the installation of the forensic software in the random access memory.

12. A method of using the peripheral of claim 1, to install forensic software into the host computer while the host computer is powered up, comprising the steps of:
- copying the forensic software into the non-transitory computer accessible medium of the peripheral;
- plugging the peripheral into the host computer; and
- waiting for the kernel of code to complete the installation of the forensic software in the random access memory.

13. The peripheral of claim 1 wherein the program product further comprises a code means to copy forensic data from the random access memory to the non-transitory computer accessible medium.

14. A method of using the peripheral of claim 13 to copy forensic data from the host computer while the host computer is powered down, comprising the steps of:
- plugging the peripheral into the host computer;
- powering on the host computer; and
- waiting for the code means to copy forensic data from the random access memory to the non-transitory computer accessible medium.

15. A method of using the peripheral of claim 13 to copy forensic data from the host computer while the host computer is powered up, comprising the steps of:
- plugging the peripheral into the host computer; and
- waiting for the code means to copy forensic data from the random access memory to the non-transitory computer accessible medium.

16. The peripheral of claim 1 wherein the program product further comprises a code means to monitor RS232 activates an IBM-PC compatible computer by monitoring ports of the host computer through the direct memory access.

* * * * *